(12) United States Patent
Huston et al.

(10) Patent No.: US 8,128,116 B1
(45) Date of Patent: Mar. 6, 2012

(54) TOW BAR AND RELEASABLE LOCK FOR TOW BAR LEG

(75) Inventors: James Huston, Yankton, SD (US); Steven Goodman, Pender, NE (US); David Merchant, Lincoln, NE (US); Leslie Roeber, Emerson, NE (US); Neil Wagner, Winsive, NE (US)

(73) Assignee: Automatic Equipment Manufacturing Company, Pender, NE (US)

( * ) Notice: Subject to any disclaimer, the term of this patent is extended or adjusted under 35 U.S.C. 154(b) by 0 days.

(21) Appl. No.: 13/068,491

(22) Filed: May 12, 2011

Related U.S. Application Data (63) Continuation of application No. 12/460,095, filed on Jul. 14, 2009, now Pat. No. 7,942,435, which is a continuation-in-part of application No. 12/386,203, filed on Apr. 15, 2009, now Pat. No. 7,988,179, and a continuation-in-part of application No. 12/454,974, filed on May 27, 2009, now Pat. No. 7,959,179.

(51) Int. Cl.
  *B60D 1/54* (2006.01)
(52) U.S. Cl. .................. 280/493; 403/109.3; 403/109.6
(58) Field of Classification Search .................. 280/493, 280/491.1, 491.2, 491.3; 403/109.1, 109.2, 403/109.8, 109.6
  See application file for complete search history.

(56) References Cited

U.S. PATENT DOCUMENTS

| | | | |
|---|---|---|---|
| 3,083,040 A | 3/1963 | Hayman et al. | |
| 3,492,022 A | 1/1970 | Hanson | |
| 4,375,893 A * | 3/1983 | Curtis | 280/146 |
| 4,640,523 A | 2/1987 | Wolmarans | |
| 4,861,061 A | 8/1989 | Frantz | |
| 5,285,702 A * | 2/1994 | Hillinger | 81/177.2 |
| 5,429,382 A | 7/1995 | Duncan | |
| 5,516,140 A | 5/1996 | Hinte | |
| 5,577,415 A * | 11/1996 | Reasoner | 74/502.4 |
| 5,873,595 A | 2/1999 | Hinte | |
| 5,957,477 A | 9/1999 | Ensz et al. | |
| 6,854,756 B1 | 2/2005 | Solberg | |
| 7,029,021 B2 | 4/2006 | Klar | |
| 7,390,007 B2 | 6/2008 | Helms et al. | |
| 7,506,889 B2 | 3/2009 | Baltrusaitis et al. | |
| 7,533,688 B2 * | 5/2009 | Schuster et al. | 137/426 |
| 7,581,288 B2 * | 9/2009 | Zhang | 15/414 |
| 2004/0190977 A1 | 9/2004 | Matern | |
| 2005/0141953 A1 | 6/2005 | Chuan | |
| 2006/0249926 A1 | 11/2006 | Smith | |
| 2007/0001425 A1 | 1/2007 | Helms et al. | |

* cited by examiner

*Primary Examiner* — Kevin Hurley
(74) *Attorney, Agent, or Firm* — Donald R. Schoonover (57) ABSTRACT

A tow bar includes a towing hitch member including a pintle hitch and secured to a towing vehicle; a towed hitch member secured to a vehicle to the towed; a head member with a lunette ring; a pair of tow bar legs, each including a proximal end including an outer member with a distal end, and a distal end including an inner member with a proximal end telescopingly displaceable within the distal end of the outer member; a leg connector mechanism pivotally connecting the proximal ends of the tow bar legs to the head member; towed connector elements secured to the distal ends of the tow bar legs and structured to releasably connect the tow bar legs to the towed hitch member; and a locking mechanism structured to automatically and releasably lock each of the tow bar legs in either a stored configuration or a deployed configuration.

13 Claims, 5 Drawing Sheets

TOW BAR AND RELEASABLE LOCK FOR TOW BAR LEG

CROSS-REFERENCE TO RELATED PATENT APPLICATIONS

This application is a continuation of U.S. patent application Ser. No. 12/460,095 filed Jul. 14, 2009 and now U.S. Pat. No. 7,942,435, which is a continuation in part of U.S. patent application Ser. No. 12/386,203 filed Apr. 15, 2009 and now U.S. Pat. No. 7,988,179, and U.S. patent application Ser. No. 12/454,974 filed May 27, 2009 and now U.S. Pat. No. 7,959,179.

BACKGROUND OF THE INVENTION

1. Field of the Invention

The present invention relates to towing accessories and more particularly without limitation, to tow bars for connecting a vehicle to be towed to a towing vehicle.

2. Description of the Related Art

A tow bar is generally used for connecting a towing hitch arrangement of a vehicle to be towed, sometimes referred to herein as a towed vehicle, to a towing hitch arrangement of a towing vehicle. For tow bar applications wherein heavy, massive equipment will be moved a relatively short distance, such as where an airliner is to be backed away from a terminal for example, the tow bar generally has only one tow bar leg. For such applications, one end of the tow bar leg may be connected to the front end of the vehicle to be moved and the other end of the tow bar leg connected to the front end of the moving vehicle so the operator of the towing vehicle can face the vehicle to be moved and can carefully observe the response of the towed vehicle as it is being slowly moved by the towing vehicle.

For applications wherein the towed vehicle will be towed at speeds other than very slow speeds, the tow bar generally has two tow bar legs, the front end of each tow bar leg separately and pivotally connected to a head portion of the tow bar. In use, the front ends of the tow bar legs form the apex of an isosceles triangle and the rear ends of the tow bar legs are spaced apart to form the sides of the isosceles triangle. The triangular configuration is intended to cause the towed vehicle to closely track the towing vehicle, both along straightaways and around corners.

Figure 1:
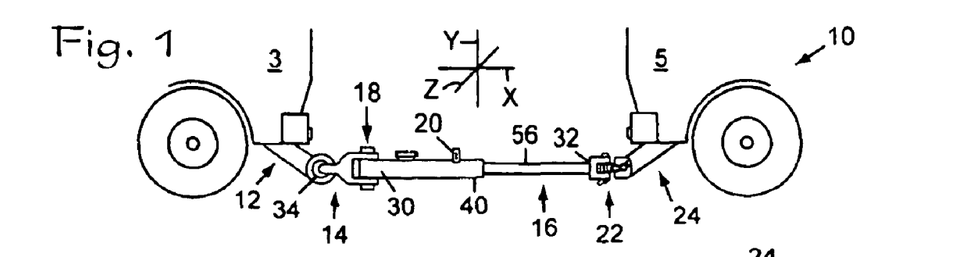
FIG. 1 is a side elevational view of a tow bar in use, the tow bar having a lunette ring head member and fishtail-reducing cammed, equiangularly-oriented tow bar legs in accordance with the present invention.

Tow bars must generally be designed to accommodate variations in attitude that inherently occur between the towing and towed vehicles, which variations are constantly and continuously changing during use. One such variation in attitude between the vehicles occurs when the instantaneous elevation of the towing vehicle differs from the instantaneous elevation of the towed vehicle. A related variation in attitude between the vehicles occurs when the instantaneous ascent/descent orientation of the towing vehicle differs from the instantaneous ascent/descent orientation of the towed vehicle. Both of these related variations in attitude can be accommodated by apparatus designed to accommodate relative rotations between the towing and towed vehicles about a transverse, horizontal axis, sometimes referred to as the "pitch" axis, see the "z"-axis in FIG. 1.

Another such variation in attitude between the vehicles occurs when the instantaneous horizontal direction in which the towing vehicle is traveling differs from the instantaneous horizontal direction in which the towed vehicle is traveling, such as when the towed vehicle is being pulled around an unbanked corner for example. This situation, sometimes referred to as "yaw", can be accommodated by apparatus designed to accommodate relative rotations between the towing and towed vehicles about a vertical axis, see the "y"-axis in FIG. 1.

Finally, another such variation in attitude between the vehicles occurs when the instantaneous sidewise tilt of the towing vehicle differs from the instantaneous sidewise tilt of the towed vehicle, such as the rocking motion which occurs when traversing uneven or rough pavement for example. This situation, sometimes referred to as "roll", can be accommodated by tow bar apparatus designed to accommodate relative rotations between the towing and towed vehicles about a longitudinal, horizontal axis, see the "x"-axis in FIG. 1.

During actual towing operations, all combinations of the pitch, yaw and roll are continuously occurring and constantly changing. Prior art is replete with tow bar designs that have been developed in an attempt to accommodate these phenomena, some of those designs being more successful than others. For example, a ball hitch/ball hitch-receiver combination securing a tow bar to a towing vehicle can theoretically accommodate all three of the pitch, yaw and roll criteria. Although the ability of such a combination to accommodate yaw is acceptable and the pivot axis therefor is well-defined, unfortunately the ability of such a hitch combination to accommodate either pitch or roll is extremely limited. Failure to strictly observe and properly accommodate such pitch and roll limitations can cause disastrous and even fatal consequences.

Another commonly used hitch arrangement involves using a conventional receiver hitch in combination with a conventional square hitch tube. Although such an arrangement may be convenient for connecting a tow bar to a towing vehicle, this type of connection by itself provides absolutely no ability to accommodate any one of the three pitch, yaw or roll criteria. As a result, either the tow bar and/or connections between the tow bar and the towed vehicle must be relied upon to provide a solution for minimizing the potentially detrimental effects arising from pitch, yaw and roll.

Another arrangement that is useful, particularly when towing massive vehicles, such as heavy military equipment for example, comprises a pintle hitch of a towing vehicle connected to a lunette ring hitch. Such a pintle/lunette ring hitch arrangement does provide the ability to accommodate pitch, yaw and roll attitudes between the towing and towed vehicles. Unfortunately, this type of hitch arrangement inherently produces some play, although minimal, between the pintle and the lunette ring. As a result, neither the pitch axis nor the yaw axis are well-defined since the pintle continually shifts back and forth, and forwardly and rearwardly in the opening through the lunette ring. In so doing, the magnitude of the applied towing force is constantly differing between the two tow bar legs causing the towed vehicle to wander or fishtail to a greater extent behind the towing vehicle than it would if the yaw axis between the pintle and lunette ring were well-defined. Such tendency to fishtail exacerbates wear and tear on the towing vehicle, on the towed vehicle, on the pintle, on the lunette ring, and on the pivotal connections between the tow bar legs and the tow bar head, which also visits greater stress on the operator of the towing vehicle while having to contend with such undesirable added activity between the towing and towed vehicles.

What is needed is a tow bar that counteracts the tendency of a towed vehicle to wander or fishtail, which tendency operatively arises from the inherent play between a pintle and lunette ring hitch connection between towing and towed vehicles.

Typically, a tow bar is first connected to a towing vehicle followed by connecting the tow bar to the towed vehicle. It is difficult, if not impossible, to perfectly align a towing vehicle with, and perfectly space the towing vehicle from, a towed vehicle so the tow bar legs can be easily and conveniently connected to the towed vehicle. Many towing hitch arrangements of towed vehicles require precise fore-to-aft, horizontal, and angular alignment of connectors of the two tow bar legs with mating connections of the towing hitch arrangement of the towed vehicle so pivot pins can be inserted horizontally through horizontally-aligned orifices of those mating connections while the tow bar legs are physically held in place relative to the connections of the towed vehicle. Such activity can be extremely stressful, sometimes requiring the efforts of more than one person, such as when connecting massive tow bars used for towing heavy military equipment for example. Such stress and effort could be reduced considerably if each of the tow bar leg connectors could be individually articulated in close proximity to the towed vehicle so each tow bar leg connector could be easily and conveniently mated with the towing hitch arrangement of the towed vehicle while the pivot pins are being inserted.

What is needed is a tow bar wherein the tow bar legs are separately extendable and retractable as needed to accommodate the difference in span of each tow bar leg when connecting the tow bar legs to a towed vehicle hitching arrangement.

What is also needed is a tow bar having articulated tow bar leg connectors for connecting tow bar legs to a towed vehicle hitch arrangement.

In an actual towing operation, it is essential that the spans of the tow bar legs from the tow bar head to the towed hitch arrangement are equal. For tow bar legs which are freely extendable and retractable to simplify connection to the towed vehicle as aforesaid, the spans after making the connections typically are unequal.

What is needed is a tow bar having a locking mechanism which, after connecting to a towed vehicle, separately and automatically locks the tow bar legs wherein the spans of the two bar legs are equal for towing purposes.

Some prior art tow bars are designed to provide a storage capability for the tow bar when the tow bar is not being used. Some of those designs are for tow bars that remain connected to the towed vehicle, such as by pivoting the tow bar legs upwardly at the front end of the towed vehicle and securing the tow bar legs in an upright configuration. Needless to say, that method of storage can be very unsightly and may obstruct forward vision when the towed vehicle is subsequently being driven on its own. Also, this arrangement is not efficient for situations wherein the towing vehicle needs to use that tow bar to pull other towed vehicles.

Accordingly, other prior art tow bars are designed to provide a storage capability wherein the tow bar remains connected to, and stored on, the towing vehicle such as by pivoting the tow bar legs upwardly or sidewise at the rear end of the towing vehicle and securing the tow bar legs in that configuration such as by hooking the tow bar legs to another part of the tow bar. Unfortunately, it is not uncommon for such arrangements to become unhooked, especially when the towing vehicle travels over very rough terrain, such as railroad tracks, potholes, and the like.

What is needed is a tow bar wherein the tow bar legs have self-storing capability and a lock mechanism which automatically locks the tow bar legs in the self-storing configuration.

What is also needed is a locking mechanism which is capable of locking the tow bar legs in either the self storing configuration or an equal-leg-span configuration.

What is further needed is a locking mechanism that is configured to prevent entry of contaminants and debris into internal structure of the locking mechanism.

SUMMARY OF THE INVENTION

The improvements of the present invention for a tow bar for connecting a towed vehicle to a towing vehicle include a towing hitch member secured to a towing vehicle and having a pintle hitch; a towed hitch member secured to a towed vehicle; a head member having a lunette ring to releasably connect to the pintle hitch; a pair of tow bar legs having a proximal with an outer member having a distal end, and a distal end with an inner member having a proximal end which is telescopingly displaceable within the distal end of the outer member; a leg connector mechanism pivotally connecting the proximal ends of the tow bar legs to the head member; towed connector elements secured to the distal ends of the tow bar legs for releasably connecting the tow bar legs to the towed hitch member; and a locking mechanism for automatically and releasably locking each of the tow bar legs in either a stored configuration or a deployed configuration.

The locking mechanism includes a shuttle portion secured to the proximal end of the inner member of each tow bar leg, and a latching portion secured to the outer member of each tow bar leg. Each shuttle portion includes tapered fore and aft shuttle ends, and a peripheral groove around an outer extremity of the shuttle portion. Each latching portion includes an aft latching device secured to the distal end of the outer member, wherein each aft latching device in conjunction with the shuttle portion releasably locks the tow bar leg in the deployed configuration. Each latching portion also includes a fore latching device secured to the proximal end of the outer member, wherein each fore latching device in conjunction with the shuttle portion releasably locks the tow bar leg in the stored configuration.

Each fore and aft latching device includes a housing, a cap, a spade device, a biasing mechanism and a release mechanism. The housing has an open upper end, an open lower end, a channel with width and length dimensions and extending to and through the upper and lower ends, and shallow opposing grooves formed in sides of the channel. The cap is removably secured to the upper end of the housing.

The spade device is slidably mounted within the channel, extends into and is radially displaceable relative to the outer member, has an upper end, and has length and width dimensions slightly smaller than the corresponding length and width dimensions of the channel.

The biasing mechanism biases the spade device toward the outer member and into the peripheral groove of the shuttle portion, and includes a coil spring having an upper end abuttingly engaging the cap and a lower end abuttingly engaging the upper end of the spade device.

The release mechanism, which enables a user to withdraw the spade device from the peripheral groove of the shuttle portion, includes a handle having an L-shaped upper end extending through an orifice in and upwardly from the cap, and has a nail head-shaped lower end rotatably captured by the upper end of the spade device.

The spring of the biasing mechanism encircles the handle, and the grooves formed in the sides of the channel retain the spring in close proximity to the handle.

PRINCIPAL OBJECTS AND ADVANTAGES OF THE INVENTION

The principal objects and advantages of the present invention include: providing a tow bar structured to counteract the tendency of a towed vehicle to wander or fishtail which tendency operatively arises from the inherent play between a pintle and lunette ring hitch connection between towing and towed vehicles; providing such a tow bar wherein the tow bar legs are separately extendable and retractable as needed to accommodate the difference in span of each tow bar leg when connecting the tow bar legs to a towed vehicle hitching arrangement; providing such a tow bar having articulated tow bar leg connectors for connecting tow bar legs to a towed vehicle hitch arrangement; providing such a tow bar having a locking mechanism which, after connecting to a towed vehicle, separately and automatically locks the tow bar legs wherein the spans of the two bar legs are equal for towing purposes; providing such a tow bar wherein the tow bar legs have self-storing capability; providing such a tow bar having a lock mechanism which automatically locks the tow bar legs in the self-storing configuration; providing such a tow bar having a locking mechanism which is capable of locking the tow bar legs in either a self storing configuration or an equal-leg-span configuration; providing such a tow bar having a locking mechanism that is configured to prevent entry of contaminants and debris into internal structure of the locking mechanism; and generally providing such a tow bar that is reliable in performance, capable of long-lasting life, and particularly well adapted for the proposed usages thereof.

Other objects and advantages of this invention will become apparent from the following description taken in conjunction with the accompanying drawings wherein are set forth, by way of illustration and example and without limitation, certain embodiments of this invention.

DETAILED DESCRIPTION OF THE INVENTION

As required, embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

A tow bar typically connects the rear end of a towing vehicle 3 to the front end of a towed vehicle 5. The reference numeral 10 generally refers to a tow bar in accordance with the present invention, as shown in FIGS. 1 through 16. The tow bar 10 includes a towing hitch member 12, a head member 14, at least one tow bar leg 16, a leg connector mechanism 18, at least one locking mechanism 20, towed connector elements 22, and a towed hitch member 24.

The following description of the present invention is directed to applications of the present invention for a tow bar 10 having a pair of tow bar legs 16, designated herein by numerals 26, 28, each tow bar leg 26, 28 having a proximal end 30 and a rearwardly-extending distal end 32. Applications of the present invention 10 for tow bars having only one tow bar leg 16 will be obvious to persons skilled in the tow bar art based on the present disclosure.

The towing hitch member 12 of the present invention 10 is secured to the rear end of the towing vehicle 3 and generally includes a pintle hitch 34, as shown in FIGS. 1-4. The towed hitch member 24 is secured to the towed vehicle 5.

The head member 14 generally includes a forwardly extending lunette ring 36 structured to releasably connect the head member 14 to the pintle hitch 34 of the towing hitch member 12. It is to be understood that for some applications of the present invention 10, the towing hitch member 12 may be a conventional receiver hitch, a hitch ball, a pintle, or other suitable arrangement, and the head member 14 may be a square tube for a conventional receiver hitch, a hitch ball receiver, a lunette ring, or other suitable arrangement.

Figures 5, 6, 8:
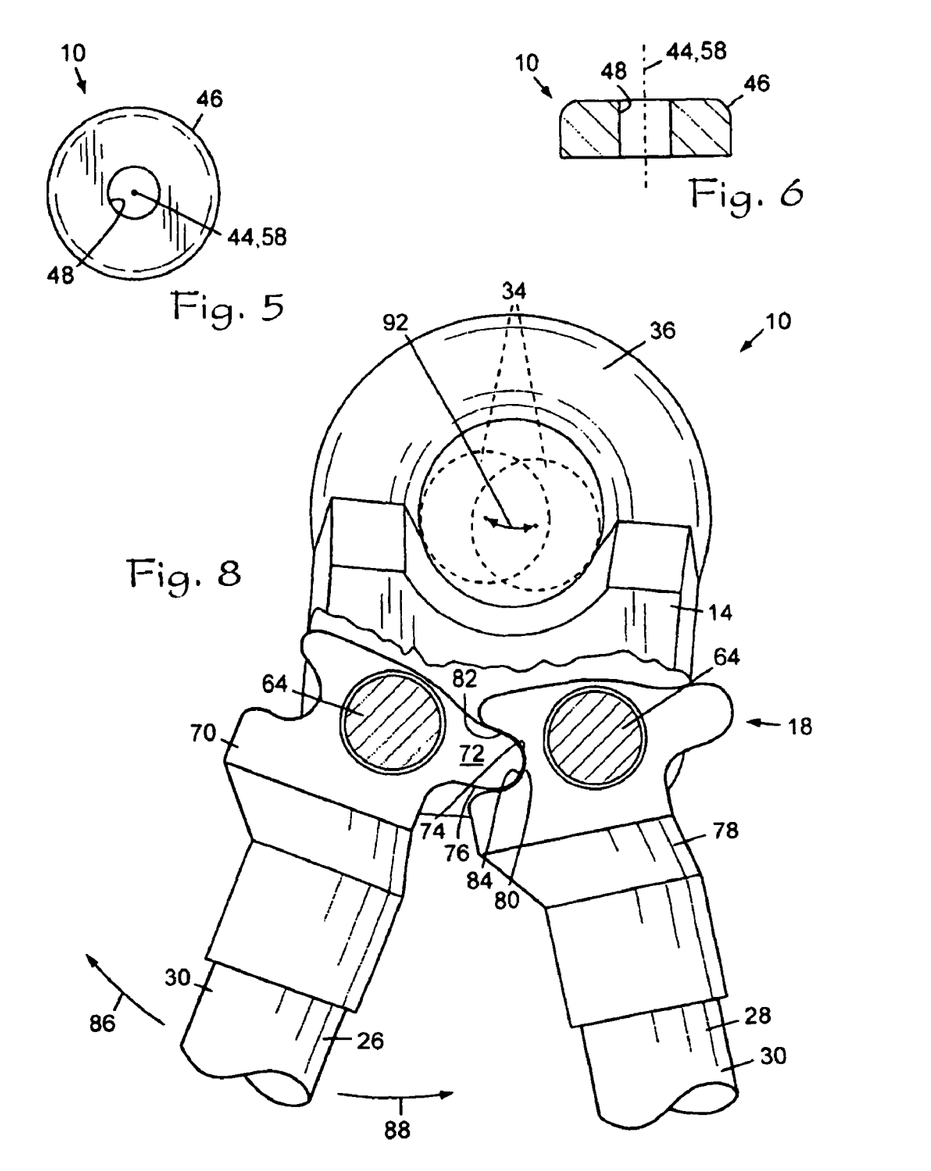
FIG. 5 is an enlarged plan view of an adapter device of the tow bar.
FIG. 6 is a further enlarged cross-sectional view of the adapter mechanism of the tow bar.
FIG. 8 is a still further enlarged, fragmentary and partially cross-sectional top plan view of the tow bar with portions cut away to reveal details thereof.
Figure 7:
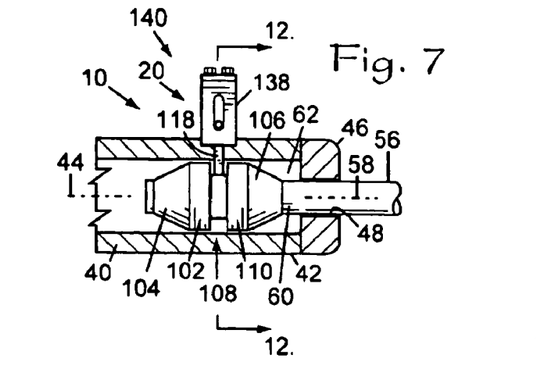
FIG. 7 is an enlarged side view showing an aft latching device of a locking mechanism of the tow bar locked in a deployed configuration.

Each of the tow bar legs 26, 28 includes a hollow outer member 40 having proximal end 30, a distal end 42, a first axis 44, an adapter device 46 having an adapter orifice 48 therethrough and secured to the distal end 42 of the outer member 40 with the adapter orifice 48 axially aligned with the first axis 44, as shown in FIGS. 5-7.

Each of the tow bar legs 26, 28 also includes an inner member 56 having distal end 32, a second axis 58, and a proximal end 60 dimensioned to be slidably insertable through the adapter orifice 48 and into the outer member 40 with the second axis 58 colinearly aligned with the first axis 44, wherein an annular cavity 62 is formed between the outer member 40 and the inner member 56, as shown in FIG. 7.

Figures 2, 3, 4:
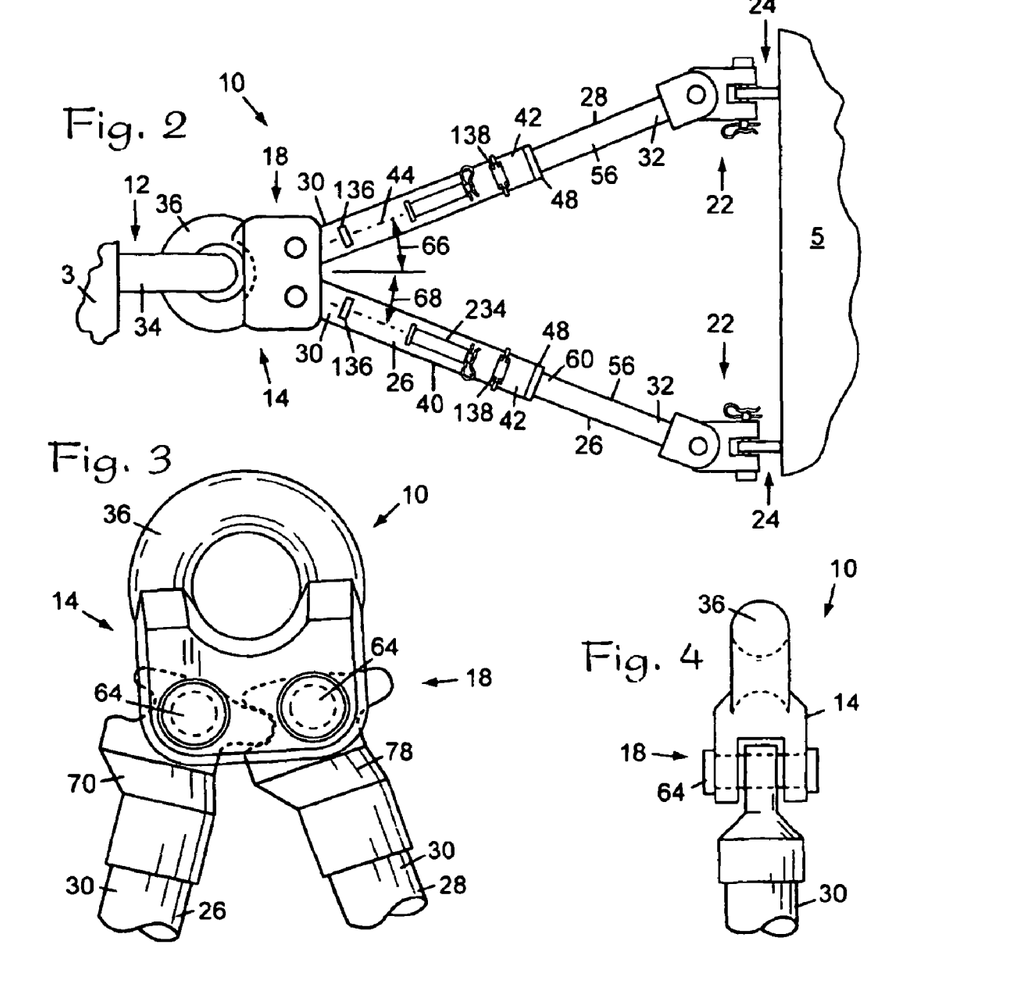
FIG. 2 is an enlarged top plan view of the tow bar.
FIG. 3 is a further enlarged and fragmentary top plan view of the lunette ring head member of the tow bar and first and second cam portions of a leg connector mechanism thereof partially shown in dashed lines.
FIG. 4 is similar to FIG. 3 but shows a side elevational view of the head member and first and second cam portions of the leg connector mechanism of the tow bar.

The leg connector mechanism 18 pivotally connects the proximal ends 30 of the tow bar legs 26, 28 to the head member 14 to pivot about a pair of pivot pins 64. Preferably, the leg connector mechanism 18 is structured to maintain the tow bar legs 26, 28 at equal but opposite angles 66, 68 relative to the head member 14, as indicated in FIG. 2. For example, the leg connector mechanism 18 may include a first cam portion 70 secured to the proximal end 30 of the first tow bar leg 26, wherein the first cam portion 70 includes a protrusion 72 having a fore outer surface 74 and an aft outer surface 76.

The leg connector mechanism 18 may also include a second cam portion 78 secured to the proximal end 30 of the second tow bar leg 28, wherein the second cam portion 78 includes a recess 80 having a fore inner surface 82 and an aft inner surface 84 which cooperatively engage the protrusion 72 of the first cam portion 70.

In other words, the protrusion 72 and recess 80 are structured wherein, as the first tow bar leg 26 is angularly displaced away from the second tow bar leg 28, as indicated by the arrow designated by numeral 86 in FIG. 8, the aft outer surface 76 of the protrusion 72 of the first cam portion 70 bears against and slides along the aft inner surface 84 of the second cam portion 78. In response thereto, the fore inner surface 82 of the recess 80 of the second cam portion 78 slides along the fore outer surface 74 of the first cam portion 70 to thereby maintain the first and second tow bar legs 26, 28 at equiangular and opposite orientations relative to the head member 14.

Figure 9:
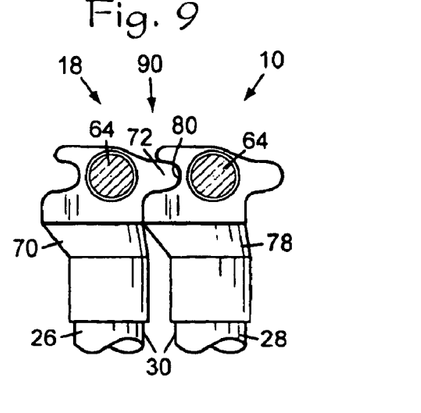
FIG. 9 is an enlarged top plan view showing the first and second cam portions of the leg connector mechanism of the tow bar in a stored configuration.

Similarly, as the first tow bar leg 26 is angularly displaced toward the second tow bar leg 28, as indicated by the arrow designated by numeral 88 in FIG. 8 and to a stored configuration 90 as indicated in FIG. 9, the fore outer surface 74 of the protrusion 72 of the first cam portion 70 bears against and slides along the fore inner surface 82 of the recess 80 of the second cam portion 78. In response thereto, the aft inner surface 84 of the recess 80 of the second cam portion 78 slides along the aft outer surface 76 of the protrusion 72 of the first cam portion 70 to thereby maintain the first and second tow bar legs 26, 28 at equiangular and opposite orientations relative to the head member 14.

Simply stated, the first and second cam portions 70, 78 of the leg connector mechanism 18 are profiled and dimensioned, and the spacing between axes of the pivot pins 64 which pivotally connect the first and second cam portions 70, 78 to the head member 14, are such that the protrusion 72 is captured within the recess 80, thereby ensuring that the first and second tow bar legs 26, 28 are maintained equiangularly- and oppositely-oriented relative to the head member 14, thereby further ensuring that the towing load is distributed substantially equally to both tow bar legs 26, 28 and that turning angles are substantially identical, whether turning to the left or to the right.

Preferably, the first and second cam portions 70, 78 of leg connector mechanism 18 are substantially identical to each other in order to reduce manufacturing costs.

Based on the teachings herein, it will be obvious to persons skilled in the relevant art that the leg connector mechanism 18, by maintaining the tow bar legs 26, 28 at equiangular and opposite orientations relative to the head member 14, eliminates unequal distributions of the towing load to the tow bar legs 26, 28, which would otherwise arise from the lunette ring 36 shifting back and forth relative to the pintle hitch 34 during towing operations, as indicated by the dashed lines and arrow designated by numeral 92 in FIG. 8.

It is foreseen that some applications within the scope and nature of the present invention may utilize other leg connector mechanisms that maintain the tow bar legs 26, 28 at equiangular and opposite orientations, such as a pair of mating cog-type gears in lieu of the first and second cam portions 70, 78. An advantage of the embodiment utilizing the first and second cam portions 70, 78 as described herein includes the abutting surfaces of the protrusion 72 and recess 80 presenting large bearing surfaces 74, 76, 82, 84 which are continuous and oriented substantially transversely to the forces applied thereagainst, thereby reducing wear and tear thereof, than would be realized with a cog-type gear arrangement for example.

Figure 10:
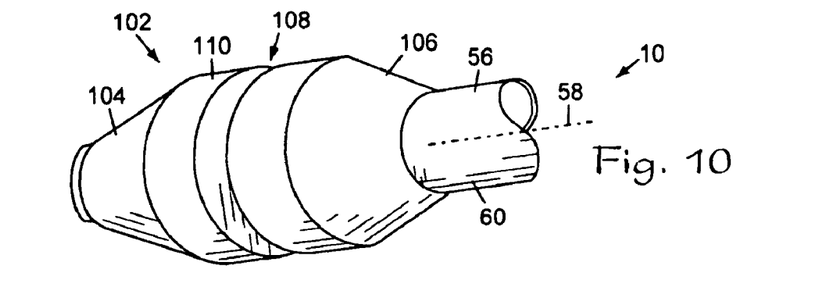
FIG. 10 a still further enlarged side view of a shuttle portion of the tow bar.
Figure 11:
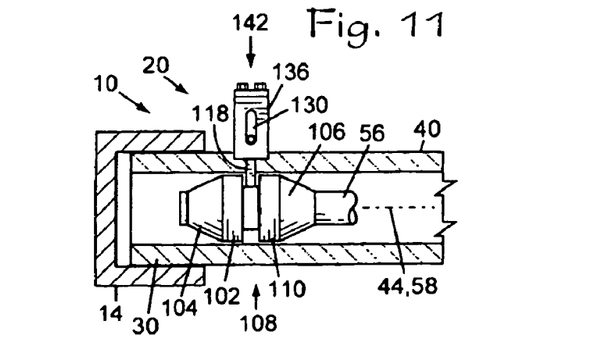
FIG. 11 is an enlarged side view showing a fore latching device of the locking mechanism of the tow bar locked in the stored configuration.

Each of the tow bar legs 26, 28 includes at least one of the locking mechanisms 20, which generally includes a cylindrically-shaped shuttle portion 102 secured to and encircling the inner member 56 of the respective tow bar leg 26, 28. The shuttle portion 102 has tapered fore and aft shuttle ends 104, 106 and a peripheral groove 108 arranged around an outer extremity 110 thereof, as shown in FIGS. 10-11. The shuttle portion 102 is dimensioned wherein the inner member 56 with the shuttle portion 102 secured thereto is slidably, longitudinally and telescopingly, displaceable in the outer member 40 along the first axis 44 of the outer member 40.

Figures 12, 13:
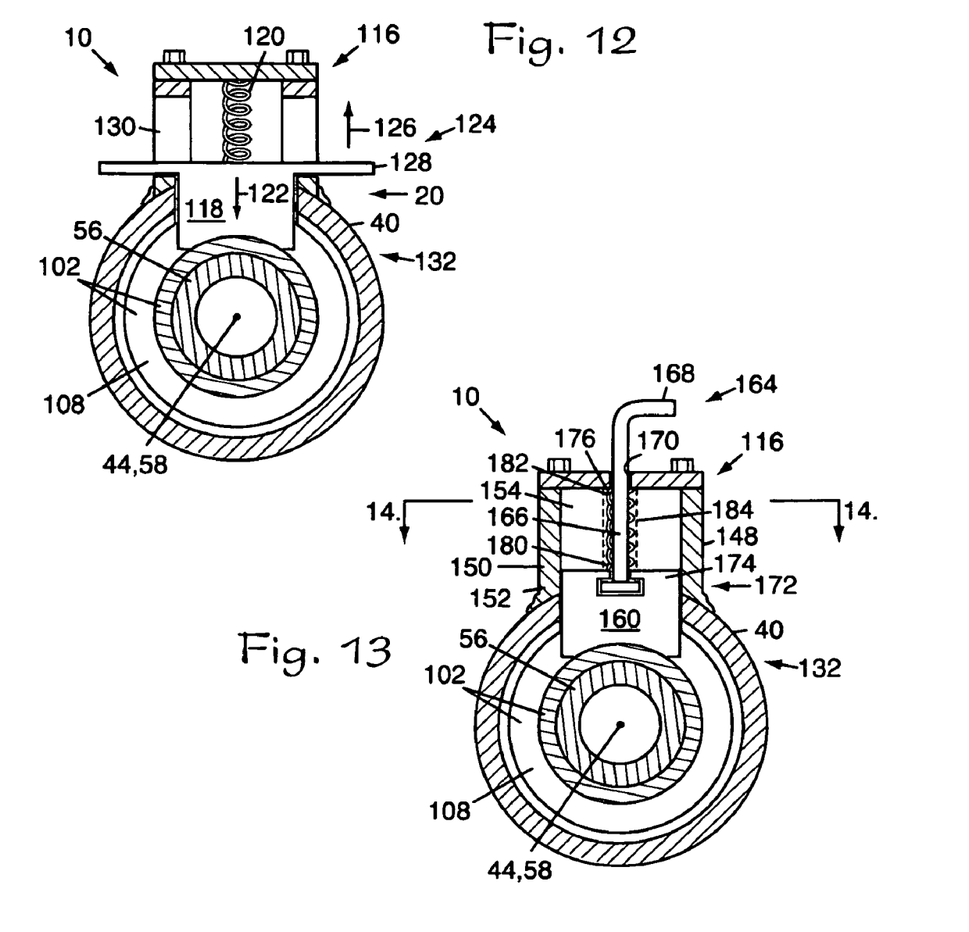
FIG. 12 is a still further enlarged and cross-sectional view of the locking mechanism taken along line 12-12 of FIG. 7.
FIG. 13 is a view similar to FIG. 12 but showing an alternate latching portion of the tow bar.

Each locking mechanism 20 also includes at least one latching portion 116, wherein each latching portion 116 is secured to the outer member 40 of the respective tow bar leg 26, 28 and includes a spade device 118 that extends through the outer member 40 and is radially displaceable relative to the outer member 40, as shown in FIG. 12.

Preferably, each latching portion 116 also includes a biasing mechanism 120, such as a spring or other resilient device for example, which is structured to operatively bias the spade device 118 radially inwardly relative to the outer member 40, as indicated by the arrow designated by numeral 122 in FIG. 12, wherein the spade device 118 normally extends into the path of the tapered fore and aft shuttle ends 104, 106 as the inner member 56 with the shuttle portion 116 attached thereto is displaced in the outer member 40 along the first axis 44.

Each latching portion 116 also includes a release mechanism 124 connected to the spade device 118 and structured to enable a user to manually displace the spade device 118 radially outwardly relative to the outer member 40, as indicated by the arrow designated by numeral 126 in FIG. 12, such as a pair of opposing extenders 128 mounted through slots 130, for example.

The following is a description of the basic function of each locking mechanism 20. As the inner member 56 of a tow bar leg 26, 28 is being longitudinally displaced relative to the respective outer member 40 wherein the tapered fore shuttle end 104 or tapered aft shuttle end 106 of the shuttle portion 102 is forced against the spade device 118 thereby displacing the spade device 118 radially outwardly relative to the first axis 44. As the spade device 118 slides over the shuttle portion 102 and passes over the peripheral groove 108 of the shuttle portion 102, the biasing mechanism 120 of the latching portion 116 automatically biases the spade device 118 into the peripheral groove 108 of the shuttle portion 102, thereby locking the tow bar leg 26, 28 in a locked configuration 132, as shown in FIG. 12, wherein the inner member 56 is no longer displaceable relative to the outer member 40 of the tow bar leg 26, 28.

Subsequently, the release mechanism 124 can be used to lift the spade device 118 out of the peripheral groove 108 by overcoming the biasing action of the biasing mechanism 120 as indicated by arrow 126 in FIG. 12. While the spade device 118 is lifted out of the peripheral groove 108, the inner member 56 and shuttle portion 102 can be displaced relative to the outer member 40 so the spade device 118 is no longer aligned with the peripheral groove 108. By then releasing the release mechanism 124, the tow bar leg 26, 28 is placed in an unlocked configuration wherein the inner member 56 can be longitudinally displaced relative to the outer member 40.

Since it is difficult, if not impossible, to perfectly align a towing vehicle with, and perfectly space a towing vehicle from, a towed vehicle for connection purposes, the tow bar legs 26, 28 of the present invention 10 are structured to simplify connecting the towed vehicle 5 to the towing vehicle 3 as follows: each locking mechanism 20 of each tow bar leg 26, 28 generally includes the shuttle portion 102 of the locking mechanism 20 being mounted near the proximal end 60 of the inner member 56 and the latching portion 116 includes identical fore and aft latching devices 136, 138. The fore latching device 136 is mounted near the proximal end 30 of the outer member 40, as shown in FIG. 11, and the aft latching device 138 is mounted near the distal end 40 of the outer member 42, as shown in FIG. 7.

With the tow bar 10 connected to the towing vehicle 3 and each of the tow bar legs 26, 28 in an unlocked configuration, the tow bar legs 26, 28 are extendable or retractable as necessary to connect the towed vehicle 5 as hereinafter described in greater detail. After connecting both of the tow bar legs 26, 28, the towing vehicle 3 is eased forwardly relative to the towed vehicle 5 causing the aft latching device 138 of each tow bar arm 26, 28 to be displaced forwardly toward their respective shuttle portion 102 until the spade device 118 of each aft latching portion 138 is forced against the tapered aft shuttle end 106 of its shuttle portion 102 which displaces the spade device 118 of the aft latching device 138 radially outwardly relative to the first axis 44.

As the spade device 118 of the aft latching device 138 slides over the shuttle portion 102 and passes over the peripheral groove 108 of the shuttle portion 102, the biasing mechanism 120 of the aft latching device 138 automatically biases the spade device 118 of the aft latching device 138 into the peripheral groove 108 of the shuttle portion 102, thereby locking the tow bar leg 26, 28 in a locked and deployed configuration 140, as shown in FIG. 7. With both of the tow bar legs 26, 28 locked in the locked and deployed configuration 140, the towed vehicle 5 is then properly aligned with, and spaced at a predetermined towing distance from, the towing vehicle 3.

Later, when the tow bar 10 has been disconnected from the towed vehicle 5 and is no longer being used, with the tow bar legs 26, 28 in the unlocked configuration, the inner member 56 of each tow bar leg 26, 28 can be separately, longitudinally and telescopingly, displaced in its outer member 40 toward the head member 14, wherein the tapered fore shuttle end 104 is forced against the spade device 118 of the fore latching device 136 displacing the spade device 118 of the fore latching device 134 radially outwardly relative to the first axis 44.

Again, as the spade device 118 of the fore latching device 136 slides over the shuttle portion 102 and passes over the peripheral groove 108 of the shuttle portion 102, the biasing mechanism 120 of the fore latching device 136 automatically biases the spade device 118 of the fore latching device 136 into the peripheral groove 108 of the shuttle portion 102, thereby locking the tow bar leg 26, 28 in a locked and stored configuration 142, as shown in FIG. 11, wherein the inner member 56 can no longer (until subsequently released as described herein) be displaced relative to the outer member 40 of the tow bar leg 26, 28.

Figure 14:
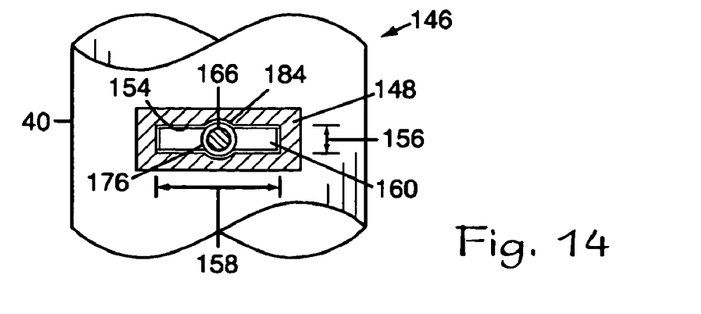
FIG. 14 is a partially cross-sectional view of the alternate latching portion taken along line 14-14 of FIG. 13.

An alternate embodiment 146 of the latching portion 116 is shown in FIGS. 13-14. Latching portion 146 includes a housing 148 having an open upper end 150, an open lower end 152, and a channel 154 having width and length dimensions 156, 158 extending to and through the upper and lower ends 150, 152. A spade device 160, slidably mounted in channel 154 and extending through lower end 152 as shown in FIG. 13, has width and length dimensions that are slightly smaller than the corresponding width and length dimensions 156, 158 of the channel 154. A cap 162 is removably secured to the upper end 150. The housing 148 is fixedly secured to the outer surface of the outer member 40.

A release mechanism 164 includes a handle 166 with an L-shaped upper end 168 slidably mounted through an orifice 170 in cap 162, and a nail head-shaped lower end 172. An upper end 174 of the spade device 160 is configured to rotatably capture the nail head-shaped lower end 172 therein.

A biasing mechanism 176, such as a coil spring for example, has a lower end 180 abuttingly engaging the upper end 174 of the spade device 160 and an upper end 182 abuttingly engaging the cap 162. Cylindrical, opposing shallow grooves 184 are formed in the sides of the channel 154 to confine the biasing mechanism 176 in close proximity to, and surrounding, the handle 166.

With respect to the shuttle portion 102, the functions of latching portion 146 are substantially similar to the functions of latching portion 116. The L-shaped end 168 can be grasped and manually pulled upwardly to withdraw the spade device 160 from the peripheral groove 108 of the shuttle portion 102.

If desired and instead of latching portion 116, latching portion 146 can be utilized for either the fore latching device 136, the aft latching device 138, or both. An advantage of latching portion 146 over latching portion 116 lies in the absence of the slots 130 in the former. As a result, the housing 148 of latching portion 146 should reduce maintenance of the tow bar 10 by preventing contaminants and debris from interfering with functioning of latching portion 146.

The towed connector elements 22 are secured to respective distal ends 32 of the first and second tow bar legs 26, 28. The towed connector elements 22 are structured to releasably connect the distal ends 32 of the tow bar legs 26, 28 to the towed hitch member 24.

Figure 15:
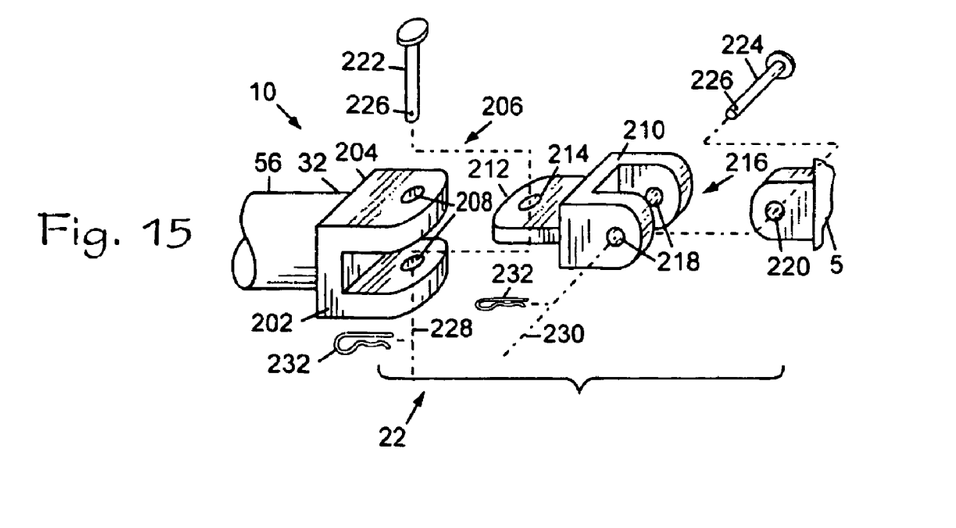
FIG. 15 is an enlarged and exploded, perspective view of a towed connector element of the tow bar.

Each of the towed connector elements 22 includes a first clevis unit 202 having a first clevis end 204 secured to the distal end 32 of the inner member 56 of the respective tow bar leg 26, 28. The first clevis unit 202 also includes a pair of rearwardly-extending first clevis legs 206 having aligned first clevis orifices 208 therethrough, as shown in FIG. 15.

Each towed connector element 22 also includes a second clevis unit 210 having a second clevis end 212 with a second clevis orifice 214 therethrough. The second clevis end 212 is dimensioned to be removably insertable between the pair of first clevis legs 206, wherein the second clevis orifice 214 is alignable with the first clevis orifices 208 of the pair of first clevis legs 206. The second clevis unit 210 also includes a pair of rearwardly-extending second clevis legs 216 having aligned third clevis orifices 218 therethrough, wherein the third clevis orifices 218 are alignable with an orifice 220 of the towed hitch member 24 of the towed vehicle 5.

Each towed connector element 22 also includes first and second pivot pins 222, 224 having bores 226 therethrough. The first pivot pin 222 is dimensioned to be removably insertable through both the second clevis orifice 214 of the second clevis unit 210 and the first clevis orifices 208 of the first clevis unit 202, wherein the second clevis unit 210 is pivotable about the first pivot pin 222 relative to the first clevis unit 202, sometimes referred to herein as a first pin axis 228.

Similarly, the second pivot pin 224 is dimensioned to be removably insertable through both the orifice 220 of the towed hitch member 24 of the towed vehicle 5 and the third clevis orifices 218 of the second clevis unit 210, wherein the second clevis unit 210 is pivotable about the second pivot pin 224 relative to the towed hitch member 24 of the towed vehicle 5, sometimes referred to herein as a second pin axis 230.

Cotter-type pins 232 removably insertable through bores 226 of the first and second pivot pins 222, 224 releasably secure the first and second pivot pins 222, 224 in the towed hitch member 24 and the first and second clevis units 202, 210. Preferably, the sizing and dimensions of the second pivot pin 224 are identical to those of the first pivot pin 222.

As hereinbefore discussed, it is difficult, if not impossible, to perfectly align a towing vehicle with, and perfectly space the towing vehicle from, a towed vehicle in preparation for connecting tow bar legs to a towing vehicle. It should be noted that each of the towed connector elements 22 is structured to easily, conveniently and separately accommodate imperfect spacing and alignment between the towed and towing vehicles 3, 5. This arises from the ability of the second clevis unit 210 to be pivoted about the first pin axis 228 relative to the first clevis unit 202 simultaneously with the ability of the inner member 56 to be rotated about the first axis 44 relative to its respective outer member 40 thereby enabling orthogonal articulation of each towed connector element 22 relative to the towed hitch member 24 of the towed vehicle 5.

After connecting the towed connector element 22 to the towed vehicle 5, the added combination of the further orthogonal articulation provided by the ability of the second clevis unit 210 to also be simultaneously pivotable about the second pin axis 230 relative to the towed hitch member 24 of the towed vehicle 5 enables the towed connector element 22 to assist other components of the tow bar 10 in accommodating all three pitch, yaw and roll components between the towing and towed vehicles, which is a substantial improvement over the no-axis or single-axis articulation provided by prior art tow bar connections between the tow bar legs of a tow bar and a towed vehicle.

Figure 16:
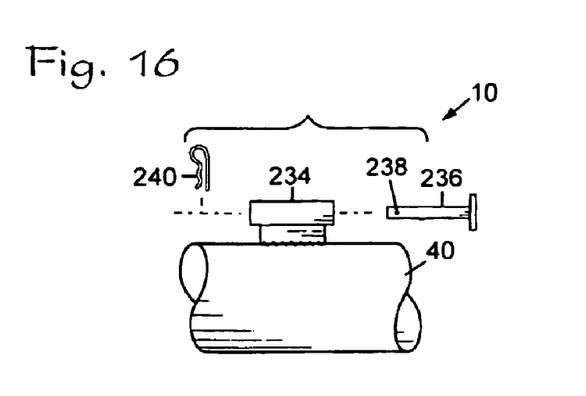
FIG. 16 is an enlarged side view of a pin retainer and pin of the tow bar, according to the present invention.

The tow bar 10 of the present invention may include a pin retainer 234 secured to the tow bar 10, such as to one or each of the outer members 42 of the tow bar legs 26, 28 for example, as shown in FIG. 16. Each pin retainer 234 includes a third pivot pin 236 having a bore 238 therethrough, wherein the third pivot pin 236 is sized and dimensioned to replace the first or second pivot pins 222, 224. The pin retainer 234 also includes a cotter-type pin 240 through bore 238 of the third pivot pin 236 to releasably secure the third pivot pin 236 in the pin retainer 234.

In an application of the present invention, the rear end of the towing vehicle 3 is temporarily positioned forwardly from the front end of the towed vehicle 5. The fore-and-aft orientations of the two vehicles do not need to be perfectly aligned, nor does the spacing between the vehicles need to be exact. The lunette ring 36 of the head member 14 is then securely connected to the pintle hitch 34 of the towing vehicle 3.

If the tow bar legs 26, 28 are in the stored configuration 90, the release mechanisms 124, 164 are manipulated allowing the tow bar legs 26, 28 to be placed in an unlocked configuration so the inner members 54 of the tow bar legs 26, 28 can be displaced longitudinally relative to their respective outer members 42, and the distal ends 32 of the tow bar legs 26, 28 are spread apart. One of the tow bar legs 26, 28 is then separately extended or retracted as necessary to adjust its length to accommodate the temporary spacing between the two vehicles while the inner member 56 thereof is rotated relative to its outer member 40 and the second clevis unit 210 of its towed connector element 22 is pivoted about the first pivot pin 222 relative to the first clevis unit 202 in order to easily and conveniently align the third clevis orifices 218 with the orifice 220 through the towed hitch member 24 of the towed vehicle 5. The second pivot pin 224 is then inserted through the orifices 218, 220 and secured in place with the cotter-type pin 232. A similar procedure is then followed with respect to the other tow bar leg 26, 28.

After both tow bar legs 26, 28 have been so connected to the towed hitch member 24 of the towed vehicle 5, the towing vehicle 3 is slowly eased forwardly relative to the towed vehicle 5 causing the spade device 118, 160 of the aft latching device 138 of each tow bar leg 26, 28 to be biased into the peripheral groove 108 of the respective shuttle portion 102, thereby locking both tow bar legs 26, 28 in the deployed configuration 140. The towed vehicle 5 is then properly aligned with, and spaced at a desired predetermined towing distance from, the towing vehicle 3. After attaching safety chains and making necessary electrical and braking connections, the towed vehicle 5 is ready to be towed.

It is to be understood that while certain forms of the present invention have been illustrated and described herein, it is not to be limited to the specific forms or arrangement of parts as described and shown.

What is claimed and desired to be covered by Letters Patent is as follows:

1. A tow bar for connecting a towed vehicle to a towing vehicle, the tow bar comprising:
    (a) a towing hitch member secured to a towing vehicle;
    (b) a towed hitch member secured to a towed vehicle;
    (c) a head member structured to releasably connect the head member to the towing hitch member;
    (d) a pair of tow bar legs, each tow bar leg having:
        (1) a proximal end including an outer member with a distal end, and
        (2) a distal end including an inner member with a proximal end telescopingly displaceable within the distal end of the outer member;
    (e) a leg connector mechanism pivotally connecting the proximal ends of the tow bar legs to the head member;
    (f) towed connector elements secured to the distal ends of the tow bar legs, the towed connector elements being structured to releasably connect the tow bar legs to the towed hitch member; and
    (g) a locking mechanism structured to automatically and releasably lock each of the tow bar legs in either a stored configuration or a deployed configuration, the locking mechanism including at least one spade device secured to each outer member and a shuttle member fixedly secured to each inner member with the shuttle member having a peripheral groove thereabout to releasably receive the at least one spade device of the respective tow bar leg.

2. A locking mechanism for a tow bar with a head and at least one tow bar leg, having a hollow outer member connected to the head and an inner member with a proximal end telescopingly displaceable longitudinally within the outer member, the locking mechanism comprising:
    (a) a shuttle portion fixedly secured to the inner member, the shuttle portion including a peripheral groove thereabout and tapered fore and aft shuttle ends; and
    (b) at least one latching portion secured to the outer member and having a radially-displaceable spade device that normally extends into the outer member;
    (c) the peripheral groove being structured to automatically and releasably receive the spade device to thereby lock the inner member relative to the outer member.

3. A locking mechanism as described in claim 2, wherein the at least one latching portion includes an aft latching device secured to the outer member near a distal end thereof to thereby releasably lock the inner member relative to the outer member in a deployed configuration.

4. A locking mechanism as described in claim 2, wherein the at least one latching portion includes a fore latching device secured to the outer member near a proximal end thereof to thereby releasably lock the inner member relative to the outer member in a stored configuration.

5. A locking mechanism as defined in claim 2, wherein the at least one latching portion includes:
   (a) an aft latching device secured to the outer member near a distal end thereof, wherein the aft latching device in conjunction with the shuttle portion is structured to releasably lock the at least one tow bar leg in a deployed configuration; and
   (b) a fore latching device secured to the outer member near a proximal end thereof, wherein the fore latching device in conjunction with the shuttle portion is structured to releasably lock the at least one tow bar leg in a stored configuration.

6. A locking mechanism as defined in claim 2, wherein the at least one latching portion includes:
   (a) a housing having an open upper end, an open lower end, and a channel extending to the upper and lower ends and having length and width dimensions;
   (b) a cap removably secured to the upper end of the housing;
   (c) the spade device being slidably mounted within the channel of the housing and normally extending into and being radially displaceable relative to the outer member, the spade device having an upper end and length and width dimensions slightly smaller than the corresponding length and width dimensions of the channel;
   (d) a biasing mechanism structured to bias the spade device toward the outer member and into the peripheral groove of the shuttle member, and
   (e) a release mechanism structured to enable a user to withdraw the spade device from the peripheral groove of the shuttle member, the release mechanism including a handle having an upper end and extending through an orifice in, and upwardly from, the cap and having a lower end connected to the upper end of the spade device.

7. A locking mechanism as defined in claim 6, wherein the upper end of the handle is L-shaped.

8. A locking mechanism as defined in claim 6, wherein the lower end of the handle is nail head-shaped and the upper end of the spade device is configured to capture the nail head-shaped lower end of the handle.

9. A locking mechanism as defined in claim 6, wherein:
   (a) the biasing mechanism includes a coil spring encircling the handle; and
   (b) shallow opposing grooves formed in sides of the channel are structured to retain the spring in close proximity to the handle.

10. A locking mechanism as defined in claim 2, wherein the at least one latching portion includes:
    (a) slots;
    (b) a biasing mechanism structured to bias the spade device toward the outer member and into the peripheral groove of the shuttle member, and
    (c) a release mechanism structured to enable a user to withdraw the spade device from the peripheral groove of the shuttle member, the release mechanism including a pair of opposing extenders mounted through the slots.

11. A locking mechanism as defined in claim 10, wherein the biasing mechanism includes a spring.

12. A locking mechanism for a tow bar with a head and a leg, having a hollow outer member with a proximal end connected to the head and a distal end, the leg also having an inner member with a proximal end telescopingly displaceable longitudinally within the outer member, the locking mechanism comprising:
    (a) a shuttle member fixedly secured to the proximal end of the inner member of the tow bar leg and including:
       (1) tapered fore and aft shuttle ends, and
       (2) a peripheral groove around an outer extremity of the shuttle member; and
    (b) a latching portion secured to the outer member of the tow bar leg and including:
       (1) an aft latching device secured to the distal end of the outer member, wherein the aft latching device in conjunction with the shuttle portion is structured to releasably lock the tow bar leg in a deployed configuration,
       (2) a fore latching device secured to the proximal end of the outer member, wherein the fore latching device in conjunction with the shuttle portion is structured to releasably lock the tow bar leg in a stored configuration, and
       (3) each fore and aft latching device including:
          (A) a housing having an open upper end, an open lower end, a channel with width and length dimensions and extending to and through the upper and lower ends, and shallow opposing grooves formed in sides of the channel,
          (B) a cap removably secured to the upper end of the housing;
          (C) a spade device slidably mounted within the channel of the housing, the spade device normally extending into and being radially displaceable relative to the outer member, the spade device having an upper end and length and width dimensions slightly smaller than the corresponding length and width dimensions of the channel,
          (D) a biasing mechanism structured to bias the spade device toward the outer member and into the peripheral groove of the shuttle member, the biasing mechanism including a coil spring having an upper end abuttingly engaging the cap and a lower end abuttingly engaging the upper end of the spade device, and
          (E) a release mechanism structured to enable a user to withdraw the spade device from the peripheral groove of the shuttle member, the release mechanism including a handle having an L-shaped upper end extending through an orifice in, and upwardly from, the cap and having a nail head-shaped lower end rotatably captured by the upper end of the spade device,
          (F) wherein the spring of the biasing mechanism encircles the handle, and the grooves formed in the sides of the channel retain the spring in close proximity to the handle.

13. A locking mechanism for a tow bar with a head and a leg, having a hollow outer member with a proximal end connected to the head and a distal end, the leg also having an inner member with a proximal end telescopingly displaceable longitudinally within the outer member, the locking mechanism comprising:
    (a) a shuttle member fixedly secured to the proximal end of the inner member of the tow bar leg and including:
       (1) tapered fore and aft shuttle ends, and
       (2) a peripheral groove around an outer extremity of the shuttle member; and
    (b) a latching portion secured to the outer member of the tow bar leg and including:
       (1) an aft latching device secured to the distal end of the outer member, wherein the aft latching device in conjunction with the shuttle portion is structured to releasably lock the tow bar leg in a deployed configuration, (2) a fore latching device secured to the proximal end of the outer member, wherein the fore latching device in conjunction with the shuttle portion is structured to releasably lock the tow bar leg in a stored configuration, and
(3) each fore and aft latching device including:
   (A) slots,
   (B) a slidably-mounted spade device normally extending into and being radially displaceable relative to the outer member,
   (C) a biasing mechanism structured to bias the spade device toward the outer member and into the peripheral groove of the shuttle member, the biasing mechanism including a spring, and
   (D) a release mechanism structured to enable a user to withdraw the spade device from the peripheral groove of the shuttle member, the release mechanism including a pair of extenders mounted through the slots.

* * * * *